United States Patent
Alpert et al.

(10) Patent No.: US 12,262,318 B2
(45) Date of Patent: Mar. 25, 2025

(54) POWER AWARE EVENT SCHEDULING

(71) Applicant: TEXAS INSTRUMENTS INCORPORATED, Dallas, TX (US)

(72) Inventors: Yaron Alpert, Hod Hasharon (IL); Yoav Ben Yehezkel, Netanya (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 284 days.

(21) Appl. No.: 17/726,355

(22) Filed: Apr. 21, 2022

(65) Prior Publication Data

US 2022/0346007 A1    Oct. 27, 2022

Related U.S. Application Data

(60) Provisional application No. 63/178,456, filed on Apr. 22, 2021.

(51) Int. Cl.
*H04W 52/02* (2009.01)
(52) U.S. Cl.
CPC .............................. *H04W 52/0216* (2013.01)
(58) Field of Classification Search
CPC  H04W 52/0216; Y02D 30/70; Y02D 72/1268
See application file for complete search history.

(56) References Cited

U.S. PATENT DOCUMENTS

| | | | |
|---|---|---|---|
| 10,405,326 B2 | 9/2019 | Campbell et al. | |
| 11,558,725 B2 | 1/2023 | Raghu et al. | |
| 11,849,400 B2 | 12/2023 | Weizman et al. | |
| 12,035,275 B2 | 7/2024 | Alpert et al. | |
| 2013/0238919 A1* | 9/2013 | Ponmudi | H04W 52/0216 713/323 |
| 2013/0250832 A1* | 9/2013 | Kim | H04W 52/0206 370/311 |
| 2016/0105849 A1* | 4/2016 | Chen | H04W 52/028 370/311 |
| 2017/0139922 A1* | 5/2017 | Lai | G06F 16/24568 |
| 2018/0041329 A1* | 2/2018 | Wang | H04W 56/0035 |

(Continued)

OTHER PUBLICATIONS

Venkateswaran, S.K., et al. "Extending Battery Life for Wi-Fi Based IoT Devices: Modeling, Strategies, and Algorithm." MobiWac '21: Proceeding of the 19th ACM International Symposium on Mobility Management and Wireless Access. Nov. 2021, pp. 147-156. https://doi.org/10.1145/3479241.3486699.

(Continued)

*Primary Examiner* — Kan Yuen
(74) *Attorney, Agent, or Firm* — Mandy Barsilai Fernandez; Frank D. Cimino

(57) ABSTRACT

A technique for power aware event scheduling including receiving, from a wireless access point, an indication of a scheduled reference event, determining, for an application event, an amount of time to generate data for a wireless uplink transmission associated with the application event, receiving timing information, the timing information indicating an amount of time to divide the generated data into data frames, determining an adjusted time based on the amount of time to generate data, the received timing information, and the scheduled reference event, triggering the application event at the adjusted time, and transmitting the data frames based on the scheduled reference event.

20 Claims, 6 Drawing Sheets

(56) References Cited

U.S. PATENT DOCUMENTS

| | | | |
|---|---|---|---|
| 2021/0126741 A1* | 4/2021 | Cao | H04L 1/188 |
| 2021/0258105 A1* | 8/2021 | Shrestha | H04L 1/1887 |
| 2022/0231824 A1* | 7/2022 | Dong | H04W 74/085 |
| 2023/0337165 A1* | 10/2023 | Hu | H04W 72/1263 |

OTHER PUBLICATIONS

Venkateswaran, S.K., et al. "IEEE 802.11PSM in ns-3: A Novel Implementation and Evaluation under Channel Congestion." 2022. In Proceedings of of ACM Conference (Conference' 17). ACM, New York, NY, USA. 8 pages. https://doi.org/10.1145/nnnnnnn.nnnnnnn.

* cited by examiner

POWER AWARE EVENT SCHEDULING

CROSS-REFERENCE TO RELATED APPLICATIONS

This application claims priority to U.S. Provisional Application No. 63/178,456 filed Apr. 22, 2021, which is hereby incorporated by reference.

BACKGROUND

Wireless Fidelity (Wi-Fi) is a wireless technology which uses radio waves to connect devices to various networks, including the Internet, and is generally based on the Institute of Electrical and Electronics Engineers (IEEE) 802.11 specification. This IEEE 802.11 specification provides a set of media access control (MAC, or Data Link) layer and physical (PHY) layer specifications for implementing wireless local area network (WLAN) communications. The PHY layer and MAC layer reside in the Open Systems Interconnection (OSI) stack or the OSI model, where layer-1 (L1) is known as the PHY layer and layer-2 (L2) is known as the MAC layer. Wi-Fi helps enable wireless devices to connect directly to one another, to local area networks, to wide area networks, or to the Internet generally. As such, Wi-Fi is helping fuel the expansion of the Internet of Things (IoT) by helping IoT devices to wirelessly communicate with other devices.

The IoT refers to a system of networked computing devices which can exchange data with other networked computing devices. These computing devices can include traditional computing devices such as desktop computers, laptops, notebooks, tablets, and smartphones, as well as other devices, such as sensors, smoke detectors, electronic locks, electronic meters, smart home devices, embedded systems, etc. In many cases, these computing devices are battery powered and techniques to help optimize power consumption may be desired.

SUMMARY

This disclosure relates to a method. The method includes receiving, from a wireless access point, an indication of a scheduled reference event. The method also includes determining, for an application event, an amount of time to generate data for a wireless uplink transmission associated with the application event. The method further includes receiving timing information, the timing information indicating an amount of time to divide the generated data into data frames. The method also includes determining an adjusted time based on the amount of time to generate data, the received timing information, and the scheduled reference event. The method also includes triggering the application event at the adjusted time and transmitting the data frames based on the scheduled reference event.

Another aspect of the present disclosure relates to a device. The device includes a networking module configured to receive, from a wireless access point, an indication of a scheduled reference event. The networking module is further configured to transmit timing information to an application executing on a processor, the timing information indicating an amount of time to divide the generated data into data frames. The device also includes a processor configured to execute instructions. The instructions cause the processor to determine, for an application event, an amount of time to generate data for a wireless uplink transmission associated with the application event. The instructions also cause the processor to determine an adjusted time based on the amount of time to generate data, the received timing information, and the scheduled reference event. The instructions further cause the processor to trigger the application event at the adjusted time; and transmit the data frames based on the scheduled reference event.

Another aspect of the present disclosure relates to a non-transitory program storage device comprising instructions stored thereon to cause a processor to receive an indication of a scheduled reference event. The instructions also cause the processor to determine, for an application event, an amount of time to generate data for a wireless uplink transmission associated with the application event. The instructions further cause the processor to receive timing information, the timing information indicating an amount of time to divide the generated data into data frames. The instructions also cause the processor to determine an adjusted time based on the amount of time to generate data, the received timing information, and the scheduled reference event. The instructions further cause the processor to trigger the application event at the adjusted time to cause the transmission of the data frames based on the scheduled reference event.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

Figure 1:
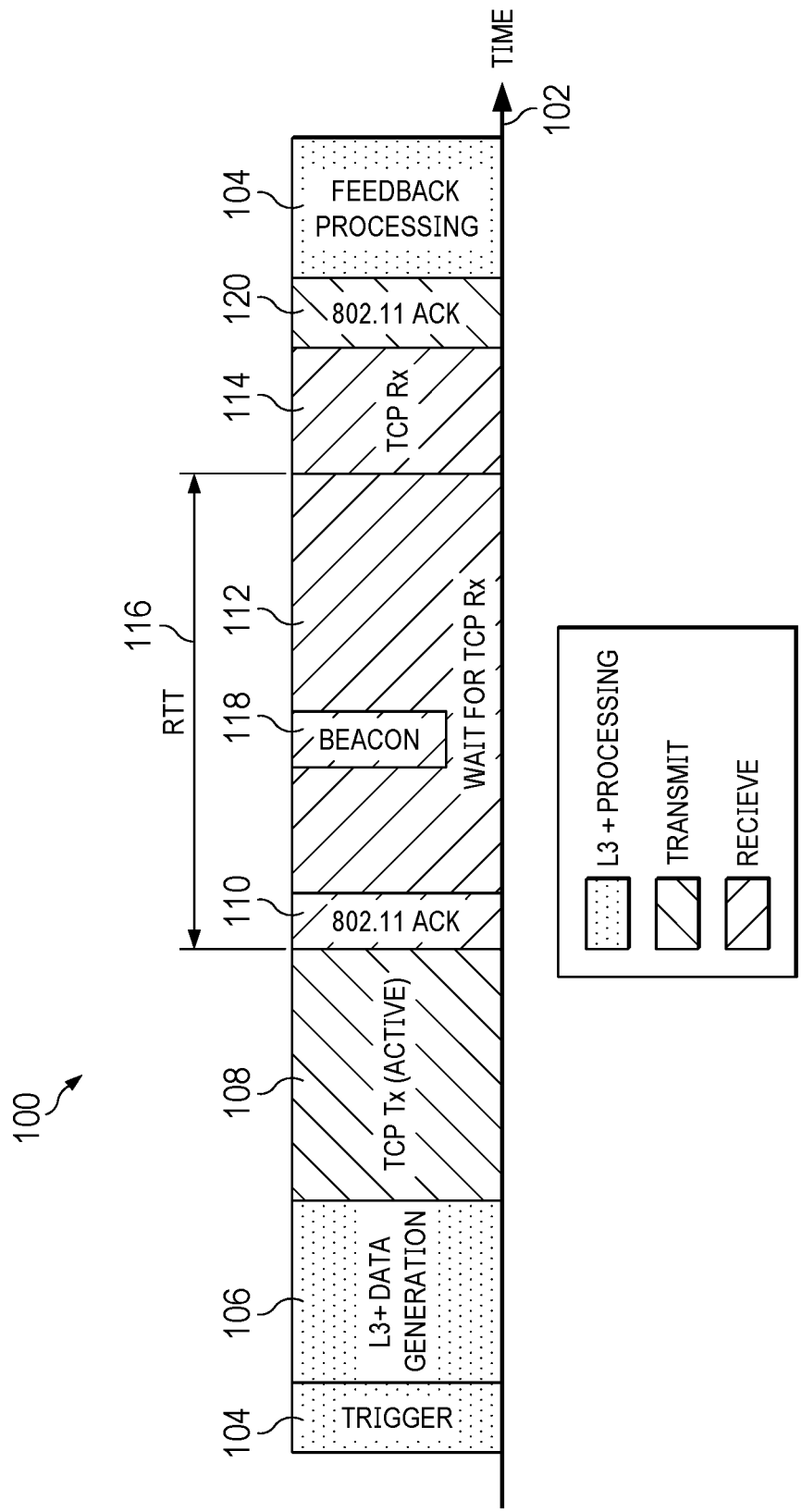
FIG. 1 is a timing diagram illustrating a data transmit and receive operation, in accordance with aspects of the present disclosure

Often, wireless devices, such as IoT devices, are battery powered and have relatively limited power budgets as compared to devices which are mains powered (e.g., plugged in). To help conserve power, some wireless devices may use a bursty (e.g., sparse) wireless communication scheme. In such a scheme, a wireless device may transmit and receive a burst of one or more network packets over a short period of time. The burst may include one or more packets that are densely distributed over a relatively short time (i.e., the burst) with a longer cycle interval between bursts. The wireless device may then enter a relatively long period of time where the wireless communications system, such as Wi-Fi, may enter a low power state. In such a low power state, the wireless communications system may be powered down and not capable of sending or receiving network packets. The wireless device may then exit the low power state and resume wireless communications at a certain time interval.

These wake-up intervals may be based on beacon signals sent, for example, by an access point (AP). The AP (also sometimes referred to as a base station, anchor point, group owner, etc.) may act as a central hub or connection point for the wireless network. In some cases, the AP may be another wireless device, such as with mesh networks, peer-to-peer networks, Wi-Fi direct, etc. Often wireless networks, such as some Wi-Fi versions, include an AP coupled to another network, such as a local area network (LAN) or the Internet. The wireless devices, also sometimes referred to as wireless nodes, connect to the other network via the AP. The AP coordinates with the wireless devices to share access to the wireless medium (e.g., the available radio frequency spectrum) and/or access to the other network. For example, the AP may periodically transmit the beacon signal. These beacon signals are sent at a quasi-known periodic time interval. This periodic time interval is often configurable and broadcast by the AP in the beacon. The beacon signals may include configuration and capability information for the wireless network along with a traffic indication map (TIM) indicating to receiving wireless devices connected to the AP whether the AP has data packets to send to the receiving wireless devices. The beacon signals also include timing information that is used to align the time base of the wireless devices to the AP. Wireless devices connected to an AP will wake up to receive at least some of the beacon signals sent by the AP to receive broadcast information (e.g., DTIM beacons), this DTIM beacons are also transmit at periodic time interval. In some cases, the AP and wireless device may be configured such that the wireless device may receive a subset of the beacon signals and skip receiving other beacon signals to help the wireless device, for example, to remain in a low power state for a longer period of time.

In some cases, rather than broadcasting a periodic beacon, some wireless networks utilize a target wake-up time (TWT) based system where a wireless device and AP may negotiate time periods where the device may transmit and receive wireless signals to and from the AP. The wireless device may refrain from exchanging data on the wireless medium outside of those TWT periods, for example, by entering a low power state.

FIG. 1 is a timing diagram 100 illustrating a single wake-up event for data transmit and receive operation, in accordance with aspects of the present disclosure. Timeline 100 includes activities across multiple OSI layers that may be performed by a device, such as an IoT device, for transmitting data, such as sensor data. Of note, while timeline 100 includes a time axis 102, the relative sizes of the steps arranged on the time axis 102 are examples and not intended to be accurate representations of relative times needed to perform the steps shown. It should be understood that while described in the context of an IoT device, the data and transmit operation may be performed by any wireless device. In some cases, an event wake-up trigger 104 may initiate a data transmit and receive operation on a wireless device, such as an IoT sensing device. This trigger 104 may be based on a timer, a sensor value, data input, etc., sufficient to cause the wireless device to initiate a transmission of data to an AP. In some cases, the trigger 104 may be a higher-level operation that occurs at the network layer or higher (e.g., L3 and above of the OSI model or above, depending on the implementation of the device OS services). For example, a scheduler, or other monitoring application, may schedule an application event based on a time interval. The application executing on the wireless device may cause the wireless device to report a sensor reading after the time interval. When the application event time (e.g., time interval) is reached, the scheduler may trigger the application to generate data and transmit the data via the wireless medium to another device. This application may configure the scheduler to trigger the application, for example via an application event, based on the time interval. Generally, application events cause application code to execute when an event is triggered or fired. For example, an application may include code for generating data to report to a destination device upon the occurrence of some event. An event handler may then monitor for this event and trigger the execution of the application code when then event is detected. The event handler may be, for example, registered with the device OS services, handled by a stub application, etc., and triggered when the event is detected.

In response to the trigger 104, the wireless device may generate data 106 to be sent by the wireless device to the AP. For example, sensor data may be obtained and the sensor data may be packetized for transmission to a destination device (e.g., target device) via the AP. The wireless device may transmit 108 the data generated 106 to the AP for routing to the destination device. Of note, the wireless device may perform the transmission 108 using transmission control protocol (TCP) and may break up the transmission 108 into multiple IP-based data packets and transmissions over the wireless medium (e.g. IP, UDP, TCP).

After the data is transmitted 108, the wireless device may receive a low-level acknowledgment 110 (e.g., L2) that the transmission was received by the AP. Of note, this low-level acknowledgment frame indicates that the transmission was received successfully by the AP but does not indicate that the data packets have been received by the destination device nor that the data packets can be reassembled (e.g. via TCP). As TCP is a reliable protocol with positive acknowledgment and retransmission, the wireless device will wait 112 to receive the TCP acknowledgment (or other protocol feedback) 114 that the transmission was successfully received by the destination device. The time period from when the wireless device finishes sending data to the destination device to when the wireless device receives an acknowledgement from the destination device, including time for the transmission to reach the destination device (e.g., propagation time), time the destination device uses generate and transmit an acknowledgement, and time for the acknowledgment to be sent back to the wireless device is referred to as the round-trip time (RTT) 116. The RTT 116 may be relatively long and, the wireless device may receive one or more incoming periodic beacon 118 transmissions during the RTT 116. Reception, processing, and use of data included with the beacon is generally handled by the L1/L2 layer (e.g., media access control layer). After the TCP acknowledgment 114 (or other protocol acknowledgment) is received, the wireless device sends a low-level acknowledgement frame 120 and may process TCP feedback reports, such as for retransmission, selective acknowledgment, etc.

In some cases, the wireless device can estimate the RTT 116, for example, based on historical data, and the wireless device may be able to enter a low-power state by not monitoring the wireless medium during a predicted RTT for a response from that destination device. The wireless device may then resume listening for the response from the destination device based on when the predicted RTT indicates that the response from the destination device should arrive. To help allow for greater power savings, it may be useful to optimize a timing of transmission 108 and the time spent in the lower power state of the wireless device with respect to scheduled reference events such as the beacon 118, or other transmit/receive windows, such as a TWT.

Figure 2:
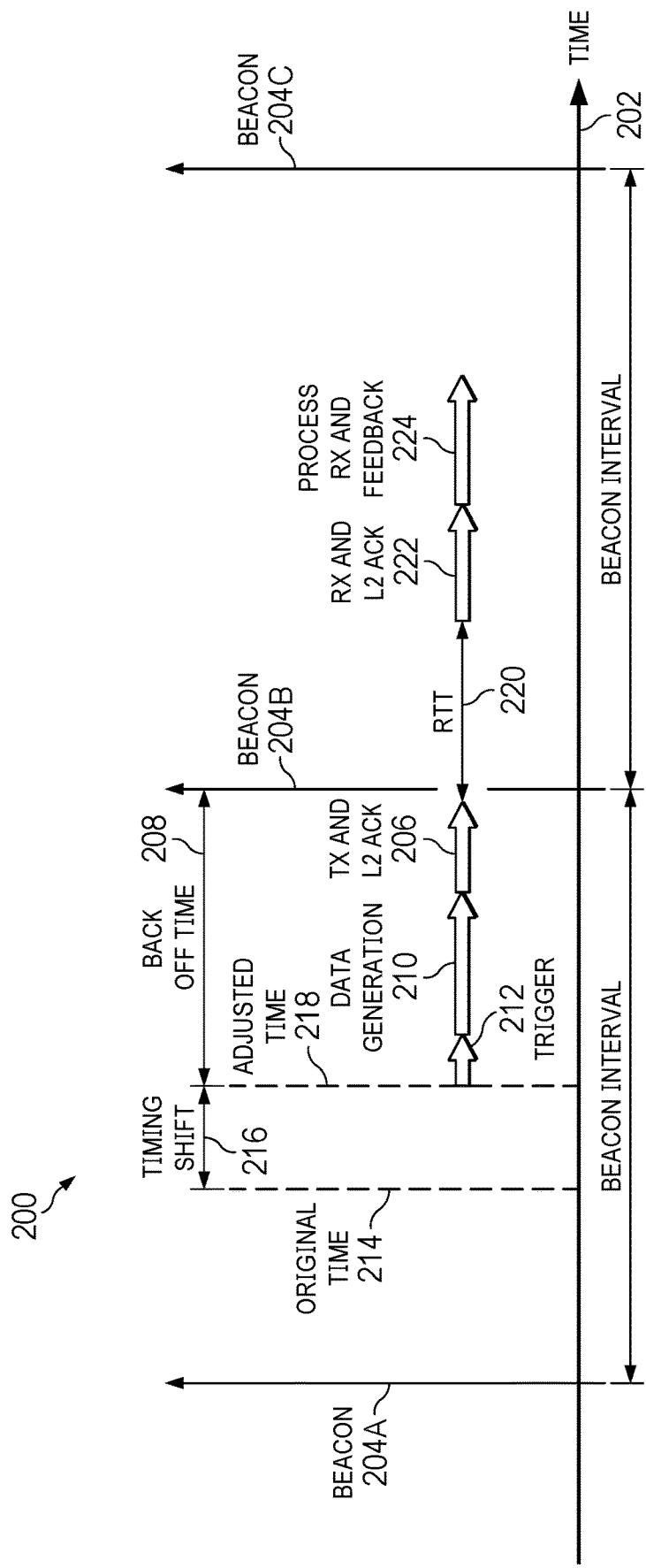
FIG. 2 is a timing diagram illustrating activity associated with an application event and transmissions over a wireless medium over a time period, in accordance with aspects of the present disclosure.

FIG. 2 is a timing diagram 200 illustrating activity associated with a single application event and transmissions over a wireless medium over a time period, in accordance with aspects of the present disclosure. As shown on a time axis 202 of the timing diagram 200, an AP broadcasts beacon signals 204A, 204B, and 204C at a scheduled periodic interval (e.g., beacon interval). A wireless device that is connected to the AP will listen for the beacons 204A, 204B, and 204C based on the beacon interval, for example, by exiting a low power state and activating a receiver circuit. It may be understood that the beacon signals 204A, 204B, and 204C may be a subset of all of the beacon signals broadcast by the AP. For clarity in this example, the wireless device listens for each of the beacon signals 204A, 204B, and 204C shown. Generally, a communications module, such as a wireless transceiver or wireless IC, of the wireless device will use an amount of power to listen for and detect incoming data, regardless of whether any data is received. This amount of power is substantially greater than an amount of power used when the communications module is in the lower power state. Thus, listening for the beacon may use a certain amount of power. Additionally, a not insubstantial amount of power is used to transition out of the lower power state and back into a higher power state. Thus, wireless device will also use some amount of power to transition out of a lower power state to listen for the beacon.

In some cases, the wireless device may regularly transmit to the AP. For example, the wireless device may execute an application which causes the wireless device to transmit one or more sensor readings to a destination device (e.g., via the AP) based on an application timer. In some examples, the application timer is part of the wireless device. Rather than sending this transmission at the whim of the application timer, which could cause a communications module of the wireless device to exit lower power state to perform the transmission, this transmission may be aligned with scheduled reference events, such as the beacon interval, of the communication layers such as the MAC and PHY. Aligning the data transmission (or application event associated with the data transmission) with the scheduled reference events of the communications layer helps conserve power by avoiding an extra transition out of the lower power state to listen for the beacon. This way, the wireless device can perform the transmission adjacent to a time period allocated to receiving the beacon (e.g., just before or after the transmission is performed) and then switch to the lower power state. As another example, the wireless device can perform the transmission, receive the beacon just after the transmission is performed, receive downlink feedback (e.g., a TCP ACK packet) after the RTT and then switch to the lower power state.

An application event may be aligned with a scheduled reference event such as beacon signal 204B by scheduling the application event so that the application data transmission and corresponding reception of the L2 acknowledgment 206 is completed just prior to the next scheduled beacon signal 204B or so that the next scheduled beacon signal 204B is received at or near the beginning or end of the RTT 220. As an example, to schedule the application event so that the data is transmitted and acknowledged at a certain time, an application event may be characterized to determine a back off time 208 from a beacon reception time associated with the application event. The back off time 208 includes an amount of time to transmit the application data and receive the L2 acknowledgment 206, along with an amount of time or time duration to generate data to be transmitted 210. In some cases, the amount of time to generate data to be transmitted 210 may include an amount of time used to process the generated data, for example, by the application. In some cases, the back off time 208 may also include an amount of time to trigger 212 the application in response to the application event. The amount of time to trigger 212 the application may include an amount of time used to exit a lower power state for one or more components of the wireless device.

Based on the back off time 208 from the beacon reception time, the wireless device can adjust the beginning of the application event, which may initially be scheduled at an original time 214, by a timing shift 216 to an adjusted time 218. The timing shift 216 is an amount of time by which the wireless device adjusts the application event, based on the back off time 208, so that the transmission associated with the application event will finish just prior to the beacon signal 204B. Exactly how long a time period there is between the transmission and L2 ack 206 and the beacon signal 204B reception time may be an implementation choice, but the time period may be sufficiently short that the communications module does not attempt to enter a lower power state in between. The time period between the transmission and L2 ack 206 and the estimated beacon signal 204B reception time may include a buffer that the wireless device can set to be zero or any number of clock cycles. For example, the wireless device may determine the back off time 208 by summing the time durations to complete the trigger 212, the data generation 210, and the transmission and L2 ack 206, plus a buffer time during which the wireless device may remain in the higher power state. The timing shift 216 may add a delay to the original time 214, cause the adjusted time 218 to be scheduled earlier than the original time 214, or leave the original time 214 unchanged.

In some cases, the back off time 208 from the beacon reception time is related to an amount of time for the data generation 210 and the initial transmission and L2 acknowledgment 206 and does not include RTT 220, nor reception of a response from the destination device and corresponding L2 Acknowledgment 222 transmitted to the AP and any processing of the response by higher layers 224, such as the TCP layer or the application. For example, the wireless device may process the TCP data packets in the response to generate a TCP acknowledgement for later transmission. In some cases, such as when the wireless device knows or can estimate the RTT 220 to be longer than a threshold value, the wireless device may transition to a lower power state while waiting for the response 222.

In some cases, the wireless device can determine the back off time 208 from the beacon reception time 204B to include a portion of the RTT 220 along with the time used for data generation 210 and the initial transmission and L2 acknowledgment 206. For example, when the RTT 220 is known or can be estimated, the back off time 208 may be determined such that reception of beacon 204B is adjacent to and occurs just prior (or just after) the reception of the response from the destination device and corresponding L2 Acknowledgment 222. In some cases, such as where the RTT 220 is estimated to be longer than the beacon interval, the back off time 208 may span one or more multiple beacon reception opportunities. As just one example, the wireless device may determine back off time 208 by summing the time durations to complete the trigger 212, the data generation 210, the transmission and L2 ack 206, and the RTT 220, minus a buffer time duration. The buffer time duration may include the time duration during which the wireless device will receive the beacon 204B and a time duration during which the wireless device will remain in the higher power state after receiving the beacon 204B and before receiving the response and L2 acknowledgement 222.

Figure 3:
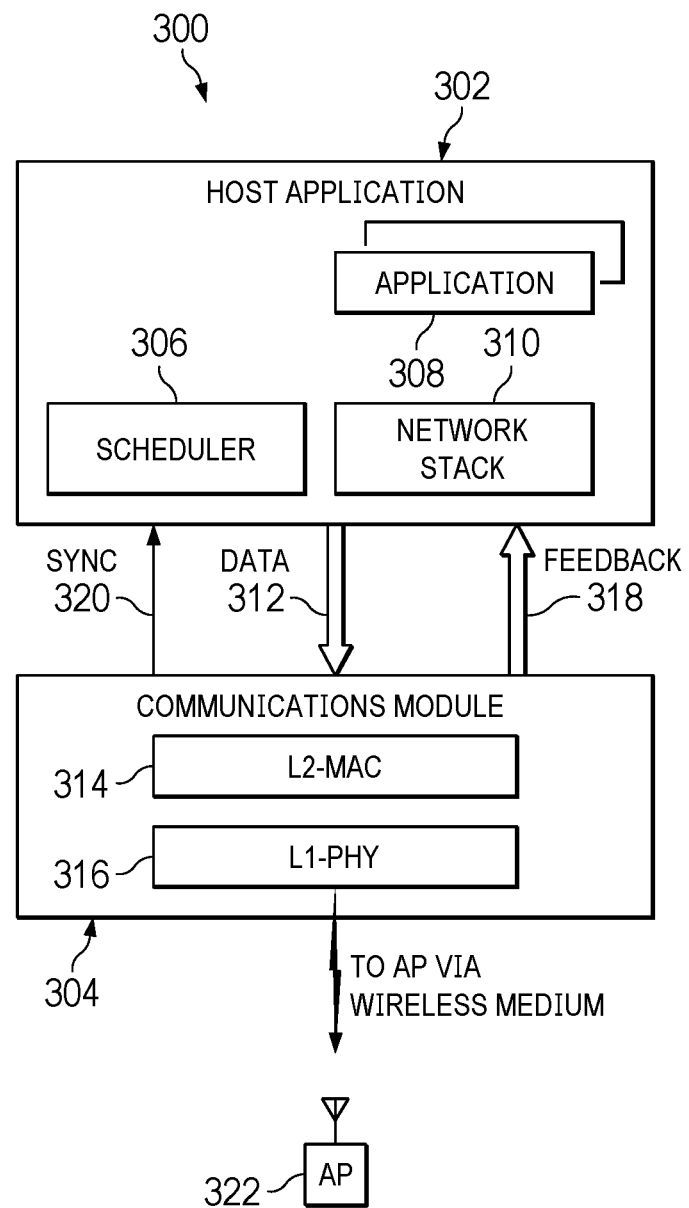
FIG. 3 is a block diagram illustrating a wireless device configured to perform power aware event scheduling, in accordance with aspects of the present disclosure.

FIG. 3 is a block diagram illustrating a wireless device 300 configured to perform power aware event scheduling, in accordance with aspects of the present disclosure. Wireless device 300 includes a host application 302 communicatively coupled to a communications module 304. The host application 302, for example, may be an operating system configured to host other applications. The host application 302 executes from a memory (not shown) on one or more processors (not shown). The host application 302 may include, or host, a scheduler 306, which coordinates operations performed by the host application 302 and the wireless device 300. For example, the scheduler 306 may help coordinate when one or more portions of the wireless device may exit a low-power state, or when certain applications 308 may be executed. The host application 302 hosts one or more software applications 308, which are executable programs (e.g., machine code instructions) to perform various operations. For example, a software application 308 may obtain data from a sensor and interpret the data. As a more specific example, the software application 308 may configure the scheduler 306 to periodically trigger an application event which indicates to the software application 308 to perform a function to generate data for transmission, such as by capturing an image from a camera sensor. The software application 308 may generate data based on the captured image, or, in some cases, the software application 308 may process the data such as by running one or more image processing algorithms on the image to detect certain objects in the image. The software application 308 may then generate data based on the processing, such as an indication whether an object is present, to send to another networked device. The software application 308 may then send the generated data to the network stack 310, for example, using an application layer protocol such as Hypertext Transfer Protocol (HTTP). The network stack 310 may then packetize and encapsulate the HTTP data using a transport layer protocol such as TCP and this data 312 is passed to the communications module 304 for transmission to the networked device.

The communications module 304 in this example includes a controller which provides L2/MAC layer functionality 314. The communications module 304 may be, for example, a Wi-Fi module or integrated circuit. The MAC layer 314 helps control the PHY layer 316 hardware that provides the interface with the wireless medium (e.g., radio frequency spectrum). The PHY layer 316 may include an RF front end (not shown for clarity) that processes an RF signal for the PHY layer 316. The MAC layer 314 may also coordinate the operations of the PHY layer 316 and RF front end, for example, by directing when the PHY layer 316 should access the wireless medium through the RF front end to transmit or receive wireless transmissions to and from an AP 322 via the wireless medium. As an example, the MAC layer 314 may schedule PHY layer 316 operations based on scheduled reference events such as beacon signals and/or TWT control signals received from the AP 322. The MAC layer 314 may direct the PHY layer 316 to access the wireless medium to receive the beacon signals to determine future transmit/receive opportunities and/or direct the PHY layer 316 to transmit data in accordance with TWT opportunities.

The MAC layer 314 also coordinates data transmissions received from higher levels. For example, the MAC layer 314 may split IP based packets such as TCP received from the network stack 310 into one or more data frames for transmission by the PHY layer 316. After the data frames of one or more TCP packets are transmitted, the communications module 304 may access the wireless medium to listen for feedback such as TCP based feedback transmitted to the wireless device. The MAC layer 314 may reassemble received data frames containing, for example, the TCP feedback 318 and pass the TCP feedback 318 to the network stack 310 for processing.

To help reduce power usage of the communications module 304, the communications module 304 may pass a sync message 320 to the host application 302. This sync message 320 may be directed, for example, to the scheduler 306 or other application 308 executing on the host application 302 and capable of modifying the scheduler 306. The sync message 320 may include timing information related to one or more scheduled reference events and/or other operations related to the communications layer and the communications module 304. These scheduled reference events may include upcoming beacon reception times, TWT window for transmitting, etc.

The timing information may also include information related to performance characteristics of the communications module 304. The information related to the performance characteristics may include timing related information related to actions performed by the communications module 304, such as an amount of time to divide data for transmitting into data frames, to transmit the data frames, and to receive acknowledgment messages for the transmission of the data frames. For example, the MAC layer 314 may take a certain amount of time to process TCP packets into data frames and to transmit those data frames. The timing information may include an indication of an estimated amount of time needed to process packets and send frames related to a certain application event. In some cases, this estimated amount of time may be based on an amount of time used to process previous TCP packets related to the application event. As another example, the performance characteristics may include an indication of an estimated amount of time to receive and/or process an L2 acknowledgment to the data frames of the TCP packets. In some cases, the wireless device 300 may determine this estimated amount of time based on an amount of time used previously to receive the L2 acknowledgement. In some cases, the wireless device 300 combines the estimated time for processing the TCP packets and receiving the L2 acknowledgement for purposes of reporting in the sync message 320.

In some cases, wireless device 300 may adjust a time which an application event is triggered based on the timing information. To adjust the timing to trigger a delay-tolerant application event for a transmission, such as a reoccurring or periodic transmission sent in response to an application event for an application executing on the wireless device, wireless device 300 may characterize an amount of time from when the application event is triggered to when the transmission is performed in response to the application event. For example, after a transmission, the communications module 304 may generate and send timing information related to the transmission to the scheduler 306. In this example, the timing information may include an amount of time needed to transmit application data along with an amount of time needed to receive the L2 acknowledgment 306. The scheduler 306 may track recent application events which caused the wireless transmission. The scheduler 306 may match such recent application events with the timing information for the corresponding transmission.

Based on a time when the scheduler 306 scheduled the application event and the timing information, the scheduler 306 can determine a back off time 208, as shown in FIG. 2, corresponding to the application event. The back off time 208 may include the amount of time needed to trigger 212 the application, the amount of time needed to generate the data for the transmission 210, and the amount of time needed to transmit application data and receive the L2 acknowledgment 206. In some case, the amount of time needed to trigger 212 the application includes an amount of time used to exit a lower power state for one or more components of the wireless device. Based on the back off time 208 for the application event, the scheduler 206 may adjust times when instances of the application event trigger the application such that the back off time 208 is completed just prior to the next scheduled beacon signal 204B.

Generally, the communications module 304 uses a certain amount of power to transmit a set of data. The communications module 304 also uses an amount of power to listen for data, regardless of whether any data is received and this amount of power is substantially greater than an amount of power used when the communications module 304 is in the lower power state. Additionally, a not insubstantial amount of power is used to transition out of the lower power state. By adjusting the time at which the application is triggered such that a transmission associated with the application event is aligned with a scheduled reference event, it is possible to reduce a number of times the communications module 304 transitions in and out of the low power state to help conserve power. In accordance with aspects of the present disclosure, the scheduler 306 may adjust a time at which an application event triggers the application based on a transmission operation time period and one or more scheduled reference events. The wireless device 300 has been described as performing operations with respect to the timing diagram 200 shown in FIG. 2, but additionally or alternatively the wireless device 300 may be configured to perform operations with respect to the timing diagram 400 shown in FIG. 4.

Figure 4:
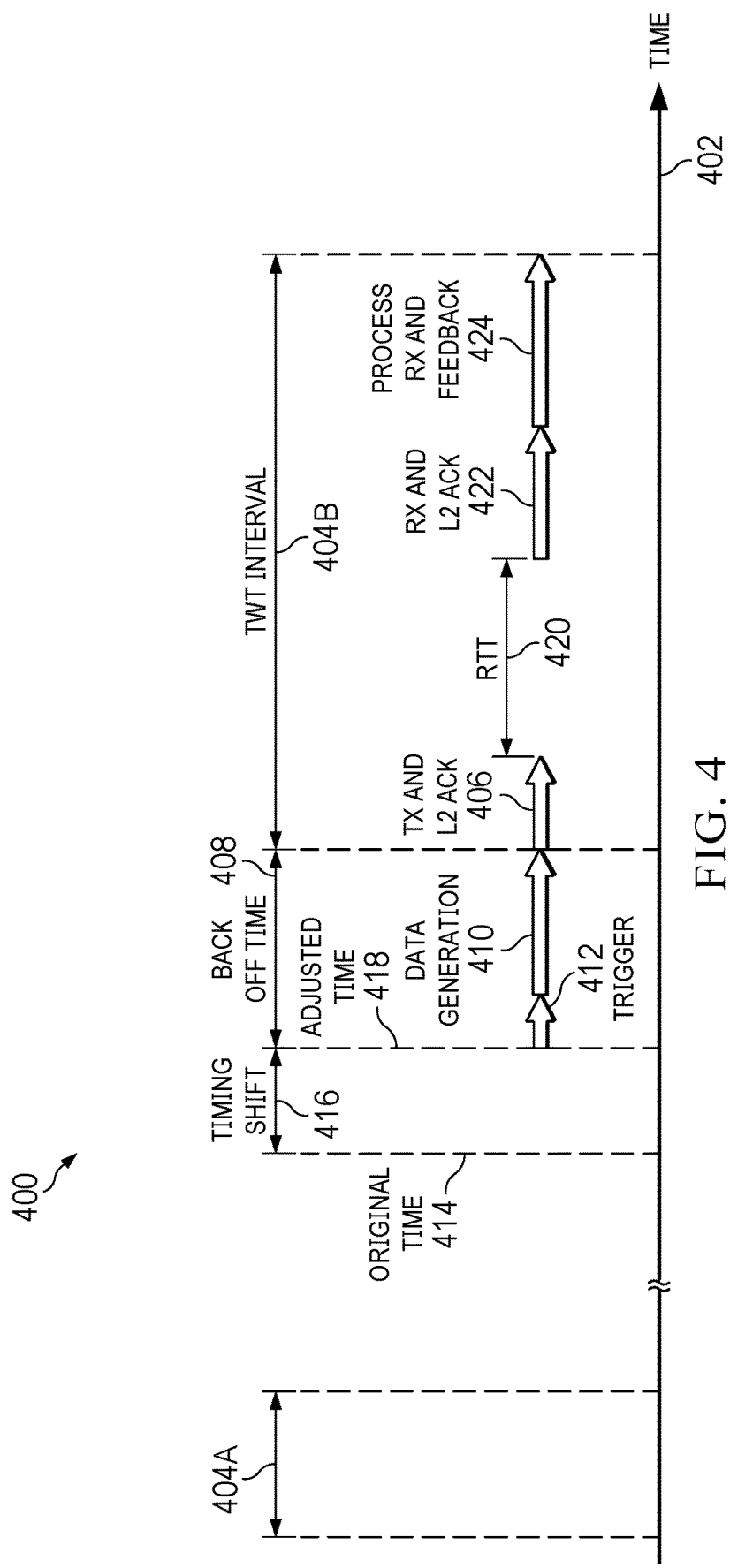
FIG. 4 is a timing diagram illustrating activity associated with an application event and transmissions over a wireless medium over a time period, in accordance with aspects of the present disclosure.

FIG. 4 is a timing diagram 400 illustrating activity and transmissions associated with an application event over a wireless medium, in accordance with aspects of the present disclosure. Timing diagram 400 illustrates aligning the transmission with a scheduled reference event of the communications layer such as a TWT. As shown on a time axis 402 of the timing diagram 400, an AP may schedule a wireless device with one or more periodic TWT intervals (e.g., windows) 404A, 404B (collectively 404). During the TWTs 404 the wireless device may exit the lower power state and listen for transmissions to the wireless device, or transmit data to the AP (for single-user TWT) or transmit data to the AP upon receipt of a trigger frame from the AP (for multi-user TWT).

The wireless device may align a transmission with a scheduled reference event such as upcoming TWT interval 404B by scheduling the application event such that application data generated and ready for transmission as soon as the TWT interval 404B begins or shortly thereafter. Such a scheduling helps minimize a delay between when the data is ready for transmission and when the data can be transmitted, for example if the application event occurs too early. This scheduling also helps allow reception of a response and corresponding acknowledgment transmission 422 to be performed within a single TWT interval 404B, which may not be possible if the application event occurs too late.

To align an application event with a scheduled reference event such as a TWT interval 404B, the wireless device may schedule the application event such that the application has been triggered 412 and data generated for transmission 410 prior to the beginning of the TWT interval 404B so that transmission of the application data 406 can start as soon as the TWT interval 404B begins. As indicated above, the wireless device can characterize an amount of time from when the application event is triggered 412 to when the transmission 406 is performed in response to the application event to adjust the timing to trigger an application event for a transmission. This characterization may be similar to that discussed above with respect to FIGS. 2 and 3. For example, after a transmission, the communications module 304 may generate and send timing information related to the transmission to the scheduler 306. In this example, the timing information may include an indication of an estimated amount of time needed to process the application data packets into frames for transmission.

The scheduler 306 may determine an amount of time that will elapse during the trigger 412 of an application and the generation of data 410 for transmission corresponding to the application event and combine this time with the timing information to determine a back off time 408 from a TWT interval 404B. In some cases, the amount of time needed to trigger 412 the application includes an amount of time used to exit a lower power state for one or more components of the wireless device. The wireless device may be configured to determine the back off time 408 by summing the time durations for the trigger 412 and the data generation 410, plus or minus an optional buffer time duration so that the data is ready for transmission 406 just before or just after the beginning of TWT interval 404B.

Based on the back off time 408 from the TWT interval for the application event, the scheduler 206 may adjust an original time 414 to an adjusted time 418 for when the application event triggers the application. For example, the scheduler 206 may be configured to set the adjusted time 418 by subtracting the back off time 408 from the time at which the scheduler 206 has estimated that the TWT interval 404B will begin. The timing shift 416 between the original time 414 and the adjusted time 418 may add a delay to the original time 414, cause the adjusted time 418 to be scheduled earlier than the original time 414, or leave the original time 414 unchanged.

Figure 5:
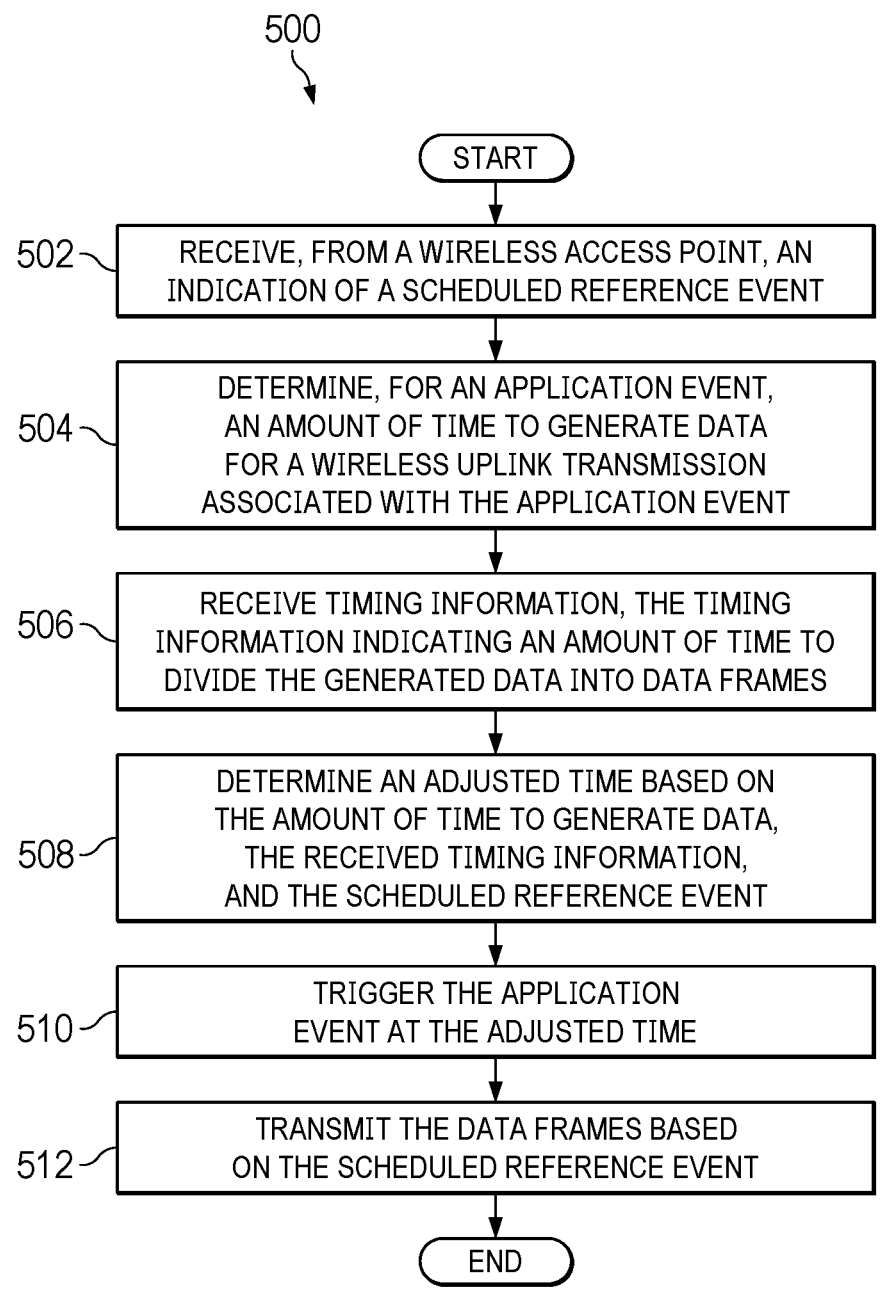
FIG. 5 is a flow diagram illustrating a technique for power aware event scheduling, in accordance with aspects of the present disclosure.

FIG. 5 is a flow diagram 500 illustrating a technique for power aware event scheduling, in accordance with aspects of the present disclosure. At block 502, the wireless device receives an indication of a scheduled reference event from a wireless AP. For example, a wireless AP may broadcast a beacon signal. The wireless AP may broadcast this beacon signal periodically, and the beacon signal may include an indication of the beacon interval. The beacon signal may encode data such as a value that represents the time duration between the present beacon and the next beacon (i.e., the beacon interval). As another example, the wireless AP may schedule the wireless device with one or more TWT. At block 504, the wireless device determines an amount of time to generate data for a wireless uplink transmission associated with an application event. For example, the wireless device may repeatedly trigger an application to execute on the wireless device based on a timer to generate data by gathering information from a sensor and then transmitting this data to a destination device. The wireless device may determine an amount of time used by the application to gather the data from the sensor and process this data for transmission.

At block 506, the wireless device receives timing information. The timing information indicates an amount of time that will elapse while the wireless device divides the generated data into data frames. For example, a lower level layer in the wireless device, such as a L2 or MAC layer may take data packets from higher layers, such as an L3 layer and divide the data packets into data frames for transmission over a wireless medium. The L2 layer may determine an amount of time that elapses while the wireless device divides the data packets and report this time as timing information back to the higher layers, for example, in a sync message.

At block 508, the wireless device determines an adjusted time based on the amount of time to generate data, the received timing information, and the scheduled reference event. For example, the higher level layer may correlate the timing information with the application event. The wireless device may combine the amount of time to generate the data with the timing information to determine a back off time from the scheduled reference event. In some cases, a scheduler or other application executing on the wireless device capable of modifying the scheduler may correlate the timing information and determine the back off time. In some cases, the wireless device may be configured to determine the adjusted time based on an amount of time that will elapse while the wireless device triggers the application event. For example, triggering the application event may cause the wireless device to exit a lower power state, which may take an additional amount of time. The wireless device may be configured to determine the back off time by summing the estimated time durations for the trigger, the data generation, the frame division, the transmission, and/or an optional buffer.

The wireless device can set the adjusted time for triggering the application event so that the application event is better aligned with the next scheduled reference event in order to promote more efficient power consumption by the wireless device. As an example, the wireless device can set the adjusted time so that the next scheduled reference event occurs a short time duration after the wireless device completes the transmission of data generated during the application event. As another example, the wireless device can set the adjusted time so that the next scheduled reference event occurs a short time duration before or after the wireless device will receive data from the wireless AP following the transmission of data generated during the application event. The wireless device may be configured to set the adjusted time so that next scheduled reference event just as, just before, or just after data is ready for transmission by the wireless device to the AP.

At block 510, the wireless device adjusts the application event time based on the adjusted time. For example, the scheduler or other application capable of modifying the scheduler may adjust the time that the wireless device triggers the application event. At block 512, the wireless device triggers the application event based on the adjusted time. For example, the wireless device can set the time that an application event is raised to trigger the application to generate the data to the adjusted time. In other words, the wireless device may be configured to trigger the application event to begin at the adjusted time.

At block 514, the wireless device transmits the data frames based on or during the scheduled reference event. In some cases, the transmission of the data frames is completed adjacent to a next beacon reception time. As an example, after transmitting the data frames, the wireless device may receive the beacon during the next beacon reception time without entering a lower power mode between the transmission of the data frames and receiving the beacon. The wireless device may transmit the data frames and may receive a lower level (e.g., L2) acknowledgement of the data frames just before the beacon reception time, allowing the beacon to be received promptly after the acknowledgment is received. One or more portions of the wireless device may enter a lower power mode or state after the beacon is received. In another example, the wireless device may determine the adjusted time such that the data frames can be transmitted just after (e.g., adjacent to) receiving the beacon. In some cases, the wireless device estimates the RTT for the data frames transmitted to a destination device and further determines the adjusted time based on the estimated RTT. For example, wireless device may determine a back off time such that a beacon signal may be received adjacent to (e.g., either just before or just after) reception of a response from destination device is received. In some cases, the wireless device transmits the data frames to the wireless AP at a beginning of a next TWT interval.

Figure 6:
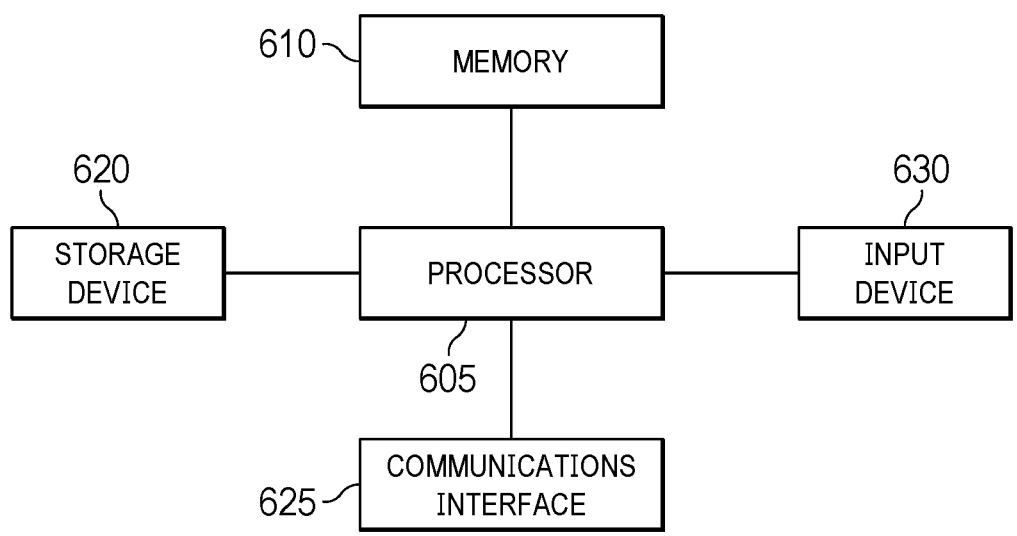
FIG. 6 is a block diagram of an example a computing device, in accordance with aspects of the present disclosure.

As illustrated in FIG. 6, device 600 includes processing circuitry such as processor 605 that contains one or more hardware processors, where each hardware processor may have a single or multiple processor cores. Examples of processors include, but are not limited to, a central processing unit (CPU), image processor, microcontroller (MCU) microprocessor (MPU), digital signal processor (DSP), a field-programmable gate array (FPGA), an application-specific integrated circuit (ASIC), etc. Although not illustrated in FIG. 6, the processing circuitry that make up processor 605 may also include one or more other types of hardware processing components, such as graphics processing units (GPUs), application specific integrated circuits (ASICs), field-programmable gate arrays (FPGAs), and/or digital signal processors (DSPs). In certain cases, processor 605 may be configured to perform the tasks described in conjunction with the host application 302 of FIG. 3.

FIG. 6 illustrates that memory 610 may be operatively and communicatively coupled to processor 605. Memory 610 may be a non-transitory computer readable storage medium configured to store various types of data. For example, memory 610 may include one or more volatile devices such as random-access memory (RAM), registers, etc. Non-volatile storage devices 620 can include one or more disk drives, optical drives, solid-state drives (SSDs), tap drives, flash memory, electrically erasable programmable read-only memory (EEPROM), and/or any other type memory designed to maintain data for a duration time after a power loss or shut down operation. The non-volatile storage devices 620 may also be used to store programs that are loaded into the RAM when such programs executed. In some cases, programs stored in the non-volatile storage device 620 may be executed directly from the non-volatile storage device 620.

Persons of ordinary skill in the art are aware that software programs may be developed, encoded, and compiled in a variety of computing languages for a variety of software platforms and/or operating systems and subsequently loaded and executed by processor 605. In one embodiment, the compiling process of the software program may transform program code written in a programming language to another computer language such that the processor 605 is able to execute the programming code. For example, the compiling process of the software program may generate an executable program that provides encoded instructions (e.g., machine code instructions) for processor 605 to accomplish specific, non-generic, particular computing functions.

After the compiling process, the encoded instructions may then be loaded as computer executable instructions or process steps to processor 605 from storage device 620, from memory 610, and/or embedded within processor 605 (e.g., via a cache or on-board ROM). Processor 605 may be configured to execute the stored instructions or process steps in order to perform instructions or process steps to transform the computing device into a non-generic, particular, specially programmed machine or apparatus. Stored data, e.g., data stored by a storage device 620, may be accessed by processor 605 during the execution of computer executable instructions or process steps to instruct one or more components within the computing device 600. Storage device 620 may be partitioned or split into multiple sections that may be accessed by different software programs. For example, storage device 620 may include a section designated for specific purposes, such as storing program instructions or data for updating software of the computing device 600. In one embodiment, the software to be updated includes the ROM, or firmware, of the computing device. In certain cases, the computing device 600 may include multiple operating systems. For example, the computing device 600 may include a general-purpose operating system which is utilized for normal operations. The computing device 600 may also include another operating system, such as a boot-loader, for performing specific tasks, such as upgrading and recovering the general-purpose operating system and allowing access to the computing device 600 at a level generally not available through the general-purpose operating system. Both the general-purpose operating system and another operating system may have access to the section of storage device 620 designated for specific purposes.

The one or more communications interfaces 625 may include a radio communications interface for interfacing with one or more radio communications devices, such as an AP (not shown in FIG. 6). In some cases, the communications interfaces 625 may include the communications module 304 as described in FIG. 3. In certain cases, elements coupled to the processor may be included on hardware shared with the processor. For example, the communications interfaces 625, storage device 620, and memory 610 may be included, along with other elements such as the digital radio, in a single chip or package, such as in a system on a chip (SOC). Computing device 600 may also include input and/or output devices, not shown, examples of which include sensors, cameras, human input devices, such as mouse, keyboard, touchscreen, monitors, display screen, tactile or motion generators, speakers, lights, etc. Processed input, for example from the image sensor, may be output from the computing device 600 via the communications interfaces 625 to one or more other devices.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Modifications are possible in the described embodiments, and other embodiments are possible, within the scope of the claims.

What is claimed is:

1. A method comprising:
   receiving, from a wireless access point, an indication of a scheduled reference event;
   determining, for an application event, an amount of time to generate data for a wireless uplink transmission associated with the application event;
   receiving timing information, the timing information indicating an amount of time to divide the generated data into data frames;
   determining an adjusted time based on the amount of time to generate the data, the received timing information, and the scheduled reference event;
   triggering the application event at the adjusted time; and
   transmitting the data frames based on the scheduled reference event, wherein the scheduled reference event comprises a beacon interval for receiving a beacon from the wireless access point, wherein the adjusted time is further determined based on an amount of time for transmitting the data frames to the wireless access point;
   receiving the beacon during a next beacon reception time;
   transmitting the data frames to the wireless access point, wherein transmission of the data frames is completed adjacent to receiving the beacon; and
   entering a low power mode after the transmitting.

2. The method of claim 1, further comprising estimating a round-trip time for the wireless uplink transmission, and wherein the adjusted time is further determined based on the estimated round-trip time.

3. The method of claim 1, wherein the scheduled reference event comprises a target wake time interval received from the wireless access point.

4. The method of claim 3, further comprising:
   preparing, based on the triggered application event, to transmit the data frames to the wireless access point at a beginning of a next target wake time interval.

5. The method of claim 1, wherein the amount of time to generate data includes an amount of time to process the data for an uplink transmission event.

6. A method comprising:
   receiving, from a wireless access point, an indication of a scheduled reference event;
   determining, for an application event, an amount of time to generate data for a wireless uplink transmission associated with the application event;
   receiving timing information, the timing information indicating an amount of time to divide the generated data into data frames;
   determining an adjusted time based on the amount of time to generate data, the received timing information, and the scheduled reference event;
   triggering the application event at the adjusted time; and
   transmitting the data frames based on the scheduled reference event, wherein the scheduled reference event comprises a beacon interval for receiving a beacon from the wireless access point, wherein the adjusted time is further determined based on an amount of time for transmitting the data frames to the wireless access point and wherein the method further comprises:

transmitting the data frames to the wireless access point, wherein transmission of the data frames is completed adjacent to a next beacon reception time;

receiving, after transmitting the data frames and before entering a low power mode, the beacon during the next beacon reception time; and entering the low power mode after the receiving.

7. The method of claim 6, further comprising estimating a round-trip time for the wireless uplink transmission, and wherein the adjusted time is further determined based on the estimated round-trip time.

8. The method of claim 6, wherein the scheduled reference event comprises a target wake time interval received from the wireless access point.

9. The method of claim 8, further comprising, preparing, based on the triggered application event, to transmit the data frames to the wireless access point at a beginning of a next target wake time interval.

10. The method of claim 6, wherein the amount of time to generate data includes an amount of time to process the data for an uplink transmission event.

11. A device comprising:
a processor; and
a networking module configured to:
receive, from a wireless access point, an indication of a scheduled reference event; and
transmit timing information to an application executing on the processor, the timing information indicating an amount of time to divide data into data frames;
wherein the processor is configured to:
receive the timing information from the networking module;
determine, for an application event, an amount of time to generate the data for a wireless uplink transmission associated with the application event;
determine an adjusted time based on the amount of time to generate the data, the received timing information, an amount of time for transmitting the data frames to the wireless access point, and the scheduled reference event, wherein the scheduled reference event comprises a beacon interval for receiving a beacon from the wireless access point;
trigger the application event at the adjusted time; and
transmit, via the networking module, the data frames to the wireless access point based on the scheduled reference event, wherein transmission of the data frames is completed adjacent to a next beacon reception time wherein the networking module is further configured to receive, after transmitting the data frames and before entering a low power mode, the beacon during the next beacon reception time, and enter the low power mode after receiving the beacon during the next beacon reception time.

12. The device of claim 11, wherein the processor is configured to estimate a round-trip time for the wireless uplink transmission, and wherein the adjusted time is further determined based on the estimated round-trip time.

13. The device of claim 11, wherein the scheduled reference event comprises a target wake time interval received from the wireless access point.

14. The device of claim 11, wherein the networking module is further configured to prepare, based on the triggered application event, to transmit the data frames to the wireless access point at a beginning of a next target wake time interval.

15. The device of claim 11, wherein the amount of time to generate data includes an amount of time to process the data for an uplink transmission event.

16. A device comprising:
a processor; and
a networking module configured to:
receive, from a wireless access point, an indication of a scheduled reference event; and
transmit timing information to an application executing on the processor, the timing information indicating an amount of time to divide data into data frames;
wherein the processor is configured to:
receive the timing information from the networking module;
determine, for an application event, an amount of time to generate the data for a wireless uplink transmission associated with the application event;
determine an adjusted time based on the amount of time to generate the data, the received timing information, and the scheduled reference event, wherein the scheduled reference event comprises a beacon interval for receiving a beacon from the wireless access point;
trigger the application event at the adjusted time; and
transmit the data frames based on the scheduled reference event, wherein the adjusted time is further determined based on an amount of time for transmitting the data frames to the wireless access point, and wherein the networking module is further configured to:
transmit the data frames to the wireless access point, wherein transmission of the data frames is completed adjacent to receiving the beacon; and
enter a low power mode after transmitting the data frames to the wireless access point.

17. The device of claim 16, wherein the processor is configured to estimate a round-trip time for the wireless uplink transmission, and wherein the adjusted time is further determined based on the estimated round-trip time.

18. The device of claim 16, wherein the amount of time to generate data includes an amount of time to process the data for an uplink transmission event.

19. A non-transitory program storage device comprising instructions stored thereon to cause a processor to:
receive an indication of a scheduled reference event from a wireless access point;
determine, for an application event, an amount of time to generate data for a wireless uplink transmission associated with the application event;
receive timing information, the timing information indicating an amount of time to divide the generated data into data frames;
determine an adjusted time based on the amount of time to generate the data, the received timing information, and the scheduled reference event; and
trigger the application event at the adjusted time to cause the transmission of the data frames based on the scheduled reference event, wherein the scheduled reference event comprises a beacon interval for receiving a beacon from the wireless access point, wherein the adjusted time is further determined based on an amount of time for transmitting the data frames to the wireless access point, wherein the transmission of the data frames is completed adjacent to a next beacon reception time, and wherein the beacon is received before or after the transmission of the data frames and before entering a low power mode.

20. The non-transitory program storage device of claim 19, wherein the scheduled reference event comprises a target wake time interval received from the wireless access point.

* * * * *